(12) United States Patent
Hines (10) Patent No.: US 12,004,484 B1
(45) Date of Patent: Jun. 11, 2024

(54) BOOM GUN SYSTEM

(71) Applicant: Finished Retriever LLC, Hanover, MN (US)

(72) Inventor: Phillip Hines, Hanover, MN (US)

(73) Assignee: Finished Retriever LLC, Hanover, MN (US)

( * ) Notice: Subject to any disclaimer, the term of this patent is extended or adjusted under 35 U.S.C. 154(b) by 0 days.

(21) Appl. No.: 18/361,778

(22) Filed: Jul. 28, 2023

(51) Int. Cl.
*A01K 15/02* (2006.01)
*F41A 33/04* (2006.01)

(52) U.S. Cl.
CPC .............. *A01K 15/02* (2013.01); *F41A 33/04* (2013.01)

(58) Field of Classification Search
CPC .......... A01K 15/02; F41B 11/00; F41B 11/60; F41B 11/62; F41B 11/80; F41C 33/002; F41A 33/00; F41A 33/04
USPC ........ 124/1, 55; 119/707, 712, 719; 102/355
See application file for complete search history.

(56) References Cited

U.S. PATENT DOCUMENTS

| | | | | |
|---|---|---|---|---|
| 2,851,991 A | * | 9/1958 | Rinck | A01K 15/02 102/444 |
| 3,063,415 A | * | 11/1962 | Chapman | A01K 15/02 119/908 |
| 3,064,753 A | * | 11/1962 | Mcclure | G01V 1/104 181/118 |
| 3,334,425 A | * | 8/1967 | Ohlund | F41A 33/04 434/16 |
| 3,714,899 A | * | 2/1973 | Filippi | F41A 33/04 102/356 |
| 3,828,886 A | * | 8/1974 | Holloway | G01V 1/104 181/118 |
| 4,182,469 A | * | 1/1980 | Bennett | F41C 33/002 224/150 |

(Continued)

FOREIGN PATENT DOCUMENTS

| | | |
|---|---|---|
| CA | 2220481 A1 | 11/1996 |
| CA | 2456852 A1 | 8/2005 |

(Continued)

OTHER PUBLICATIONS

Thunder Equipment—"Thunder 100 Shotgun Simulator"—Downloaded Sep. 21, 2023—Available from Internet <URL: https://www.thunderequipment.com/products/T100.php>.

(Continued)

*Primary Examiner* — Alexander R Niconovich
(74) *Attorney, Agent, or Firm* — Gallium Law; Wesley Schwie; Michael Bakke (57) ABSTRACT

An apparatus may include a body defining a first perimeter. The body may include a closed first body end, an open second body end opposite the first body end, and a first wall therebetween, the first wall at least partially surrounding the first perimeter thereby forming an interior of the body. An inlet may extend through the first wall, the inlet configured to receive a nozzle of a commercial gas canister. The apparatus may include an exhaust defining a second perimeter smaller than the first perimeter, the exhaust fixedly coupled to the second body end. The exhaust may include an open first exhaust end, an open second exhaust end opposite the first exhaust end, and a second wall therebetween, the second wall at least partially surrounding the second perimeter. The first exhaust end may be configured to fluidly couple to the second body end.

20 Claims, 10 Drawing Sheets

(56) References Cited

U.S. PATENT DOCUMENTS

| | | | | |
|---|---|---|---|---|
| 4,245,403 A | * | 1/1981 | Hipp | F42B 4/24 472/64 |
| 4,307,529 A | * | 12/1981 | White | F41F 7/00 42/105 |
| 4,365,471 A | * | 12/1982 | Adams | F02K 7/02 102/305 |
| 4,642,611 A | * | 2/1987 | Koerner | G10K 15/04 116/22 A |
| 4,664,631 A | * | 5/1987 | Pederson | F41A 33/04 89/7 |
| 5,180,878 A | * | 1/1993 | Denchfield | F41A 33/04 102/702 |
| 5,430,691 A | * | 7/1995 | Fridman | F23C 15/00 367/145 |
| 5,864,517 A | * | 1/1999 | Hinkey | F41H 13/0081 367/145 |
| 5,944,502 A | * | 8/1999 | Denchfield | F41A 33/04 431/1 |
| 5,983,551 A | * | 11/1999 | Lalor | A01K 15/02 42/105 |
| 6,192,612 B1 | * | 2/2001 | Maier | F41A 1/04 89/14.6 |
| 6,536,153 B2 | * | 3/2003 | Lindsey | F41C 33/002 24/2.5 |
| 7,187,291 B2 | * | 3/2007 | Crist | A01K 15/02 340/687 |
| 7,334,541 B2 | * | 2/2008 | Reiter | F42B 8/00 119/712 |
| 7,882,926 B2 | * | 2/2011 | Fullerton | F41H 11/12 89/7 |
| 8,172,034 B2 | | 5/2012 | Fullerton | |
| 9,004,013 B2 | * | 4/2015 | Bianchi | F42B 5/145 119/51.01 |
| 9,464,860 B2 | * | 10/2016 | Wilson | A01K 15/02 |
| 9,746,284 B2 | * | 8/2017 | McCarthy | F41C 33/002 |
| 10,178,854 B1 | * | 1/2019 | Lawson | A01K 15/021 |
| 10,228,216 B2 | * | 3/2019 | Reeves | F41C 33/007 |
| 10,508,882 B2 | * | 12/2019 | Valdez | F41A 33/02 |
| 2003/0116100 A1 | * | 6/2003 | Cullen | F41A 33/04 102/302 |
| 2009/0249677 A1 | * | 10/2009 | Lalor | A01K 15/021 119/720 |
| 2010/0212600 A1 | * | 8/2010 | Knies | A01K 15/02 119/719 |
| 2011/0023791 A1 | * | 2/2011 | Palmer | F41A 33/04 119/719 |
| 2011/0232584 A1 | * | 9/2011 | Valencia | A01K 15/02 119/719 |
| 2015/0208612 A1 | | 7/2015 | Bianchi et al. | |
| 2018/0031350 A1 | * | 2/2018 | Rohel | F41C 33/002 |
| 2020/0096283 A1 | * | 3/2020 | Valdez | F41A 33/02 |

FOREIGN PATENT DOCUMENTS

| | | |
|---|---|---|
| CA | 2910054 C | 4/2021 |
| CN | 106818528 A | 6/2017 |
| CN | 107410080 A | 12/2017 |
| DE | 607000 C | 12/1934 |
| DE | 10237930 A1 | 2/2004 |
| DE | 20315550 U1 | 2/2004 |
| DE | 202004003627 U1 | 5/2004 |
| EP | 1457755 A1 | 9/2004 |
| EP | 3254051 B1 | 4/2022 |
| GB | 2195421 A | 4/1988 |
| GB | 2433869 A | 7/2007 |
| GB | 2507525 A | 5/2014 |
| GB | 2600699 A | 5/2022 |
| JP | 3439863 B2 | 8/2003 |
| JP | 2009264651 A | 11/2009 |
| WO | 2011065225 A1 | 6/2011 |
| WO | 2018085948 A1 | 5/2018 |

OTHER PUBLICATIONS

Thunder Equipment—"Mini Boom Gun"—Downloaded Sep. 21, 2023—Available from Internet <URL: https://www.thunderequipment.com/products/miniboomgun.php>.

Thunder Equipment—"Thunder Micro Boom"—Downloaded Sep. 21, 2023—Available from Internet <URL: https://www.thunderequipment.com/products/microboomgun.php>.

Retriever training.net—"Boom Gun/Shotgun Simulator", Feb. 1, 2022—Downloaded Sep. 21, 2023—Available from Internet <URL: https://www.retrievertraining.net/threads/boom-gun-shotgun-simulator.220597/>.

Boom Gun Gear—"Shotgun Simulator"—Downloaded Sep. 21, 2023—Available from Internet <URL: https://www.boomguns.com/product-page/shotgun-simulator>.

* cited by examiner

BOOM GUN SYSTEM

BACKGROUND

Boom guns for training animals, such as hunting dogs, are specially designed firearm emulators used to simulate the sound and experience of gunfire during training exercises. They are typically lightweight, single-shot shotguns or blank-firing guns specifically crafted for dog training purposes. The boom gun allows trainers to create controlled and safe environments for dogs to become familiar with the loud noise and associated sensations of gunfire.

These gun simulators for training are often designed to discharge blanks or reduced-load ammunition. They produce a realistic sound to acclimate dogs without causing harm or fear. The goal is to desensitize hunting dogs to the loud noise, helping them remain calm and focused during actual hunting situations.

Boom guns for training hunting dogs play a vital role in building a dog's confidence, reducing anxiety, and ensuring they are prepared for the hunting experience. By creating a controlled training environment, trainers can establish a positive association between the sound of gunfire and the pursuit of game, improving the dog's performance in the field and enhancing the overall hunting experience.

SUMMARY

Figure 1:
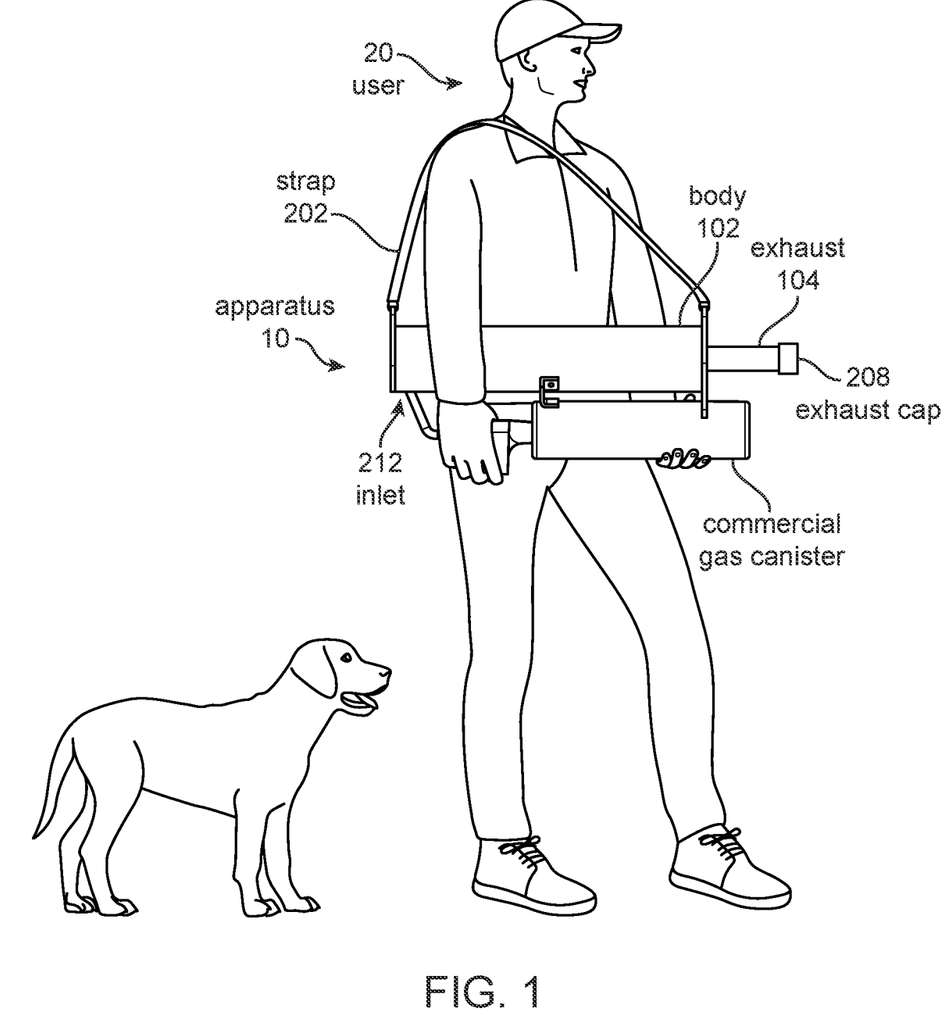
FIG. 1 illustrates a diagrammatic view of a boom gun system, as it may appear in use.
Figure 3:
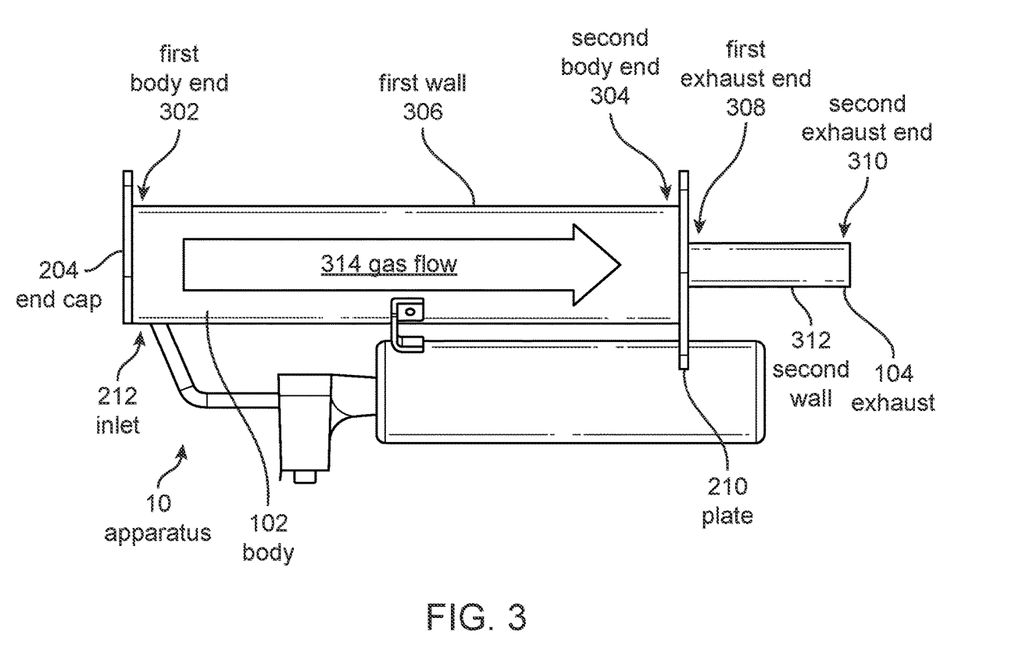
FIG. 3 illustrates another example of a side view of a boom gun system.

Included in the present disclosure is an apparatus (e.g., see the apparatus 10 as shown in FIG. 1), including a body (e.g., see the body 102 as shown in FIG. 1) defining a first perimeter. In some examples, the body includes a first body end (e.g., see the first body end 302 as shown in FIG. 3), a second body end (e.g., see the second body end 304 as shown in FIG. 3) opposite the first body end, and a first wall (e.g., see the first wall 306 as shown in FIG. 3) therebetween.

Figure 4A:
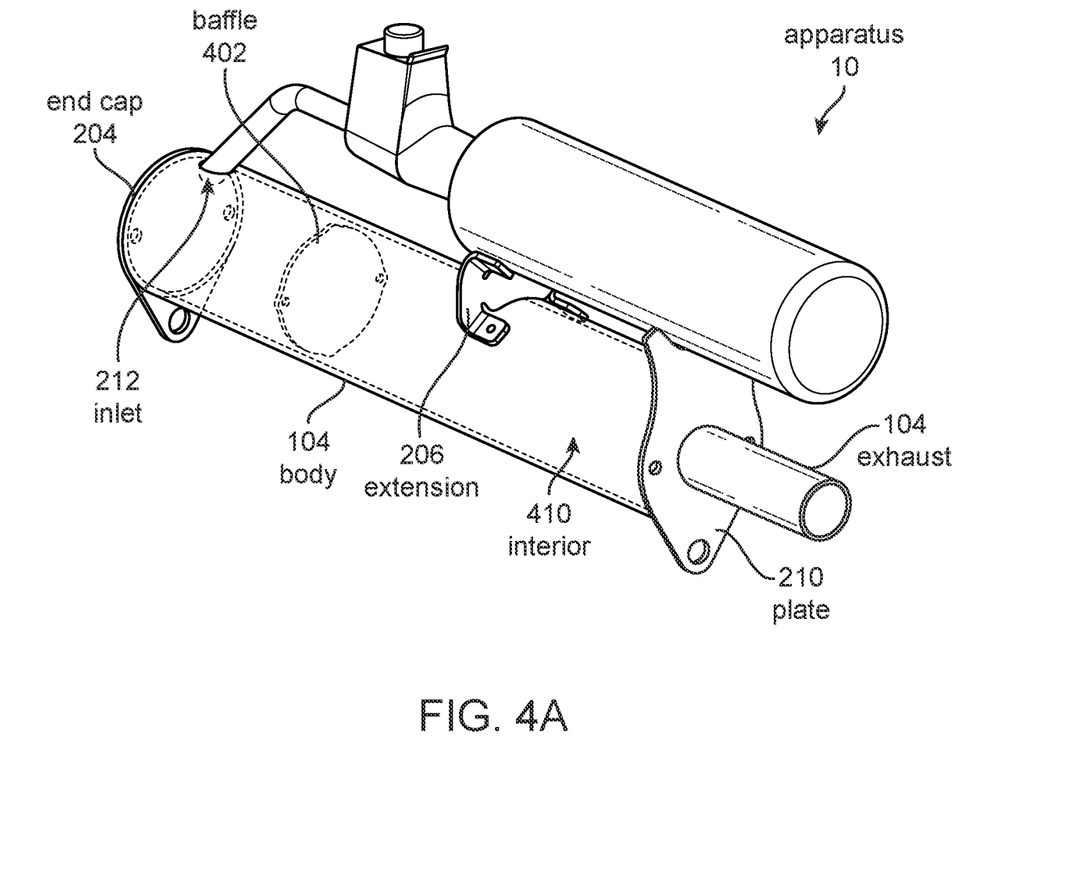
FIG. 4A illustrates one example of a semi-transparent perspective view of a boom gun system.

According to some examples, the first body end is closed and the second body end is open. The apparatus may include the first wall at least partially surrounding the first perimeter, thereby forming an interior (e.g., see the interior 410 as shown in FIG. 4A) of the body.

Figure 2:
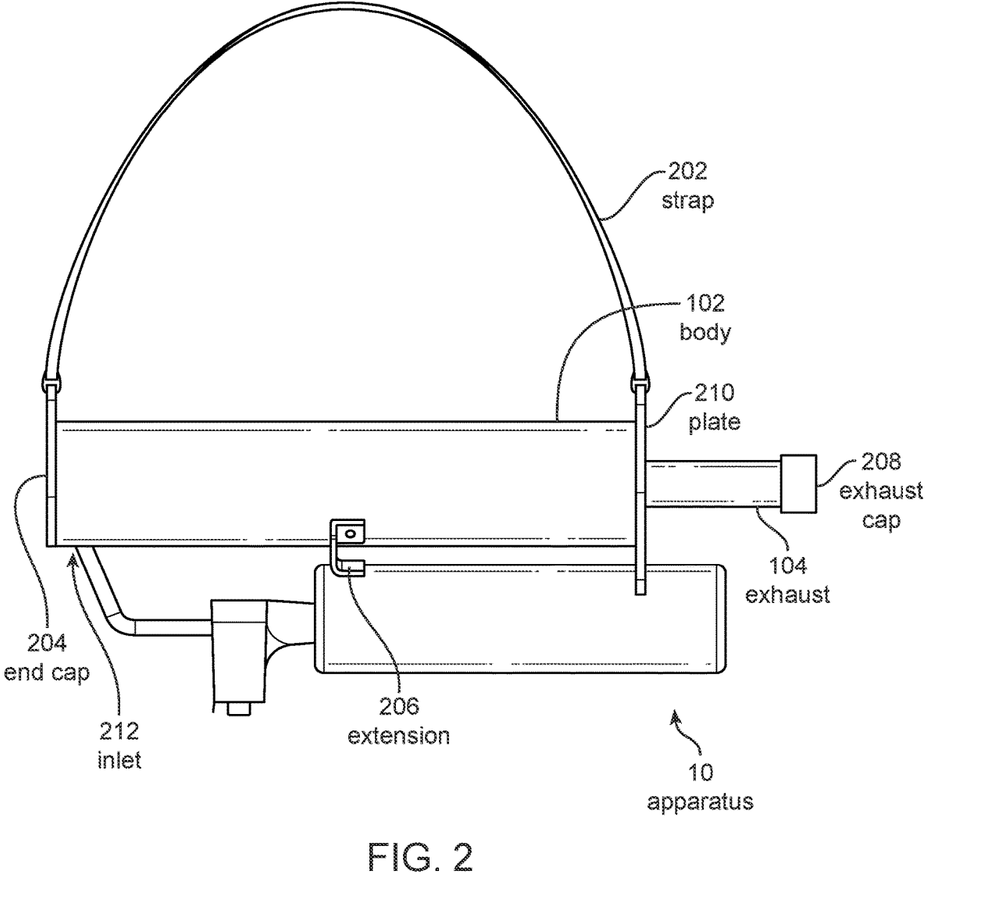
FIG. 2 illustrates one example of a side view of the boom gun system of FIG. 1.

In some examples, an inlet (e.g., see the inlet 212 as shown in FIG. 2) extends through the first wall.

According to some examples, the inlet is configured to receive a nozzle of a commercial gas canister.

The apparatus may include an exhaust (e.g., see the exhaust 104 as shown in FIG. 1). According to some examples, the exhaust is fixedly coupled to the second body end. The exhaust may define a second perimeter that is smaller than the first perimeter.

In some examples, the exhaust includes a first exhaust end (e.g., see the first exhaust end 308 as shown in FIG. 3), a second exhaust end (e.g., see the second exhaust end 310 as shown in FIG. 3) opposite the first exhaust end, and a second wall (e.g., see the second wall 312 as shown in FIG. 3) therebetween. According to some examples, the second wall at least partially surrounds the second perimeter. The apparatus may include the first exhaust end and the second exhaust end being open. In some examples, the first exhaust end is configured to fluidly couple to the second body end.

The foregoing, and other features and advantages of the invention, will be apparent from the following, more particular description of the preferred embodiments of the invention, the accompanying drawings, and the claims.

BRIEF DESCRIPTION OF THE DRAWINGS

These and other features, aspects, and advantages are described below with reference to the drawings, which are intended to illustrate, but not to limit, the invention. In the drawings, like characters denote corresponding features consistently throughout similar embodiments.

COMPONENT INDEX

10—Apparatus
20—User
102—Body
104—Exhaust
202—Strap
204—End cap
206—Extension
208—Exhaust cap
210—Plate
212—Inlet
302—First body end
304—Second body end
306—First wall
308—First exhaust end
310—Second exhaust end
312—Second wall
314—Gas flow
402—Baffle
408—Inset
410—Interior
502—Standoff
602—Hole
604—Connection point
606—Opening
702—Hole
704—Connection point
800, 802, 804, 806, 808, 810—Method steps
900, 902, 904, 906, 908—Method steps

DETAILED DESCRIPTION

Boom guns are a type of shotgun sound simulator designed to produce the sound and intensity of a shotgun without the use of live ammunition. They commonly feature the ignition of a gas to produce the desired sound. Boom guns come in a variety of sizes and are often made of materials that can withstand the force of a gas ignition and the resulting soundwaves.

Boom guns have become popular in the past decades, especially as a tool for noise-training dogs for hunting or professions where they will be around firearms, such as in the military or police force. However, boom guns contain several deficiencies the present disclosure seeks to remedy.

One of these deficiencies that is common in many boom guns is that there are multiple places for air to enter the device, leading to premature ingress of air into the system. In boom guns that rely on the ignition of gas and air to produce their sound, they require the mixture to include both the gas and the air, not one or the other. The problem with this is that when the user does not intend to fire the boom gun, the only thing that is stopping the firing is the absence of the gas.

As many boom guns use a standard methylacetylene-propadiene propane (MAPP) gas canister to supply the gas, the entry of gas into the boom gun is controlled by partially depressing the trigger of the gas canister to release the gas. Ignition is then caused by fully depressing the trigger.

In many situations, it is possible that the trigger will be unintentionally partially depressed, releasing gas into the ignition chamber without the user's knowledge. In this case, depressing the trigger slightly more to fully depressed would ignite the gas and air mixture, which would be unexpected by the user. As the ignition reaction progresses, a sound and blast wave are produced that can cause damage to anything in their path when exiting the boom gun. This could be a significant safety issue as this could mean anything from the window of a car being blown out to bodily injury to the user or a dog being trained.

Another of the deficiencies in many boom guns is the construction and lack of replaceable parts. Commonly, the construction of a boom gun often includes a nozzle, trigger mechanism, and/or end cap that is irremovably coupled to the body of the boom gun. This is often achieved by welding pieces of the boom gun together. The issue with this is three-fold: boom guns end up being harder to manufacture, more expensive, and more difficult to replace portions of if they become damaged.

By welding many of the pieces together when manufacturing the boom guns, the boom guns are taken off the assembly floor or line and must go to a welder, which is a time-consuming and expensive extra step. As the manufacturing takes more time and is more expensive, the costs are then transferred onto the customer, making the price point for a boom gun prohibitive for many people.

Additionally, the welding of pieces together makes it so the user has no real way to repair their boom gun if they damage it, save for bringing it to a welder, which is again expensive, welding it themselves, which they could do incorrectly and cause further safety issues when firing the boom gun they believe to be repaired, or buying an entirely new boom gun. The chance of damaging the boom gun is also increased when it includes an irremovable nozzle and/or trigger mechanism, as these pieces often stick out and away from the body of the boom gun and could be damaged by catching or bumping into things.

A third deficiency of many boom guns is that they are awkward and difficult to operate without two hands. Many boom guns have their trigger mechanism between the body of the boom gun and the MAPP gas tank, leaving little space for the user to activate the trigger mechanism. This can often lead to non-ergonomic holding of the boom gun. This is compounded if there is no strap or securing mechanism as the user is left to hold the gun in an uncomfortable position the entire time they carry it.

This awkwardness of many boom guns can then result in fatigue on the body of the user as well as fatigue of the components of the boom gun where the user is forced to hold the boom gun, such as the exhaust or nozzle components. Additionally, the two-handedness of boom guns in the prior art means that the user would be unable to have a hand free for other activities that would benefit the purpose of the boom gun's use, such as throwing a retrieving bumper when training a hunting dog.

FIG. 1 illustrates a diagrammatic view of an apparatus 10, also referred to as a "boom gun" throughout this specification, as it may appear in use. In this view, a user 20 is carrying the apparatus 10 with a portion of a body 102 of the apparatus 10 being partially covered by the arm of the user 20. FIG. 1 further shows the user 20 with a strap 202 on their shoulder to help carry the weight of the boom gun. It is understood, however, that the strap is not necessary for the apparatus 10 to work as intended and may not be present or may be present in another form, such as a cross-body strap or holder.

Also seen in FIG. 1 is an exhaust 104, which may provide the ability to direct the sound output from the apparatus 10 and has a smaller diameter than the body 102. The smaller diameter is beneficial because it forces the sound waves through a smaller cross-sectional area, which may increase the decibel level and more accurately simulate the sound of a shotgun.

FIG. 1 further shows an exhaust cap 208 on the end of the exhaust 104 away from the body 102 of the apparatus 10, which may be used to keep substances out of the exhaust 104 and body 102, such as debris or the premature ingress of air. While the exhaust cap 208 is not necessary for the apparatus 10 to function as intended, it can provide an additional level of assurance that the interior of the apparatus 10 is free of unintended substances.

FIG. 1 also shows a commercial gas canister, such as a methylacetylene-propadiene propane (MAPP) gas canister, below the body 102, including a nozzle that fits into an inlet 212. Additionally included on the commercial gas canister is an actuator or trigger mechanism, most of which is within the user's 20 hands in this figure and located on the commercial gas canister opposite the body 102. These components highlight two aspects of the invention that overcome deficiencies found in the prior art as previously discussed: the use of a commercial, replaceable gas canister, nozzle, and actuator mechanism and an ergonomic design.

By using a commercial, replaceable gas canister, nozzle, and actuator mechanism, whereas the prior art uses a nozzle or nozzle connector that is integrated into their designs, the present invention is able to quickly replace their gas canister, nozzle, and/or actuator mechanism, and can buy the components to do so at almost any hardware store. This saves the user 20 from either having to go through a costly repair or having to buy an entirely new boom gun.

The ergonomic design of the present invention allows the user 20 to more easily use and carry the apparatus 10 by bringing the trigger mechanism out of an enclosed space and putting it where the user's 20 hand would normally sit next to their body. Additionally, the ergonomic design places the trigger mechanism in their hand, rather than forcing the user 20 to twist their hand, wrist, and/or arm to press the trigger mechanism. It also allows them to use the apparatus 10 entirely with one hand if they choose, leaving the other hand available for additional uses, such as throwing a retrieving bumper when training an animal, such as a hunting dog. Furthermore, the ergonomic design shown in FIG. 1 allows the user 20 to take the weight of the apparatus 10 off of their hands and wherever their hands hold the apparatus 10, such as the body 102 or the exhaust 104, reducing the fatigue on the user's 20 hands and the components of the apparatus 10 itself.

FIG. 2 illustrates a side view of an apparatus 10, perhaps the apparatus 10 of FIG. 1. As shown in FIG. 2, the apparatus 10 includes a strap 202, as previously seen in FIG. 1, that is removably coupled to an end cap 204 and a plate 210. Attaching the strap to these points allows the user 20 to distribute the weight of the apparatus 10 as they choose, as the end cap 204 and plate 210 are at opposite ends of the body 102. This allows the strap 202 to connect to points on the apparatus 10 that are almost the full length of the device away from each other while avoiding putting additional strain on the points it connects to, such as if the strap 202 was connected to the exhaust 104.

Additionally shown in FIG. 2 is an extension 206 connected on one end to the body 102 and with the opposite end partially around the commercial gas canister. The extension 206 stabilizes the commercial gas canister by limiting its side-to-side movement and preventing the previously mentioned ergonomically designed layout of apparatus 10 from being modified to become non-ergonomic. This also helps to maintain the integrity of the commercial gas canister, nozzle, and actuator mechanism by reducing the amount the user 20 may have to replace these pieces. Without the extension 206, the commercial gas canister, nozzle, and/or actuator mechanism may move and be damaged by knocking into other components or objects in the environment.

FIG. 2 also shows an inlet 212 where the nozzle of the commercial gas canister enters the body 102 of the apparatus 10. The inlet 212 allows the nozzle of the commercial gas canister to supply gas directly into the body of the boom gun, where it can mix with air to create a combustible gas-air mixture.

The inlet 212 is beneficial to this process because it creates an air-tight seal around the nozzle of the commercial gas canister when the nozzle is inserted, allowing the user 20 to limit the amount of air entering and gas leaving the apparatus 10 and giving them more control over the concentrations of gas and air in the mixture. This control over the gas and air concentrations allows the user 20 to make adjustments in the gas-air mixture and thereby have some regulation over the intensity of the sound the boom gun produces between uses.

Another component illustrated in FIG. 2 is an exhaust cap 208, which is shown on the end of the exhaust 104 opposite the plate 210. The exhaust cap 208 also assists the user 20 in maintaining control of the gas-air mixture by keeping an air-tight seal on the exhaust 104 of the boom gun, creating a closed system when the nozzle of the commercial gas canister is coupled to the inlet 212. As used in this disclosure, a closed system is a system that does not let any matter in or out of the system. If either the nozzle of the commercial gas canister is not coupled to the inlet 212 or the exhaust cap 208 is not coupled to the end of the exhaust 104, the system would no longer be a closed system (otherwise known as an open system). The air-tight seal created by the exhaust cap 208 prevents air from prematurely entering the apparatus 10 through the exhaust 104.

As air is not allowed to prematurely enter the boom gun, the requisite gas-air mixture for combustion cannot be created within the body 102. This means the exhaust cap 208 may also act as a safety for the apparatus 10, as premature pressing of the trigger mechanism, also commonly referred to as the actuator or actuator mechanism, would no longer be sufficient to cause a combustion reaction. The exhaust cap 208 also prevents other unintended substances from entering the boom gun through the exhaust 104, such as dirt, moisture, and debris. This keeps the boom gun from becoming filled with materials that would interfere with the combustion reaction, that may be expelled along with the sound waves, or that could damage the boom gun.

FIG. 3 illustrates another example of a side view of apparatus 10 and shows a gas flow 314 in the direction that the combustion and sound waves move when the gas-air mixture is ignited within the boom gun. It also illustrates a first body end 302 which is shown to be the end of the body 102 with the end cap 204 and in which the nozzle of the commercial gas canister enters the inlet 212 and the gas flows into the body of the boom gun.

The gas flow 314 is further shown to move from the first body end 302 to a second body end 304 at the end of the body with the plate 210 and the exhaust 104. The gas flow 314 is also shown to be contained between the first body end 302 and the second body end 304 by a first wall 306. The first wall 306 may extend about the perimeter of the first body end 302 and the second body end 304, forming a tube or similar structure.

FIG. 3 additionally illustrates a first exhaust end 308, across the plate from the second body end 304, where the gas flow 314 enters the exhaust 104 from the body of the boom gun. The first exhaust end 308 is further shown to be on the opposite end of the exhaust 104 as a second exhaust end 310, from which the gas flow 314 and the sound waves resulting from ignition of the gas-air mixture exit the apparatus 10.

Similar to the first wall 306, FIG. 3 shows that the gas flow 314 is contained within the exhaust 104 between the first exhaust end 308 and the second exhaust end 310 by a second wall 312. The second wall 312 may extend about the perimeter of the first exhaust end 308 and the second exhaust end 310, forming a tube or similar structure. FIG. 3 further shows the distance along the second wall 312 between the first exhaust end 308 and the second exhaust end 310 to be shorter than the distance along the first wall 306 between the first body end 302 and the second body end 304, although this is not a requirement for the boom gun to operate as intended.

FIG. 4A illustrates a semi-transparent perspective view of the apparatus 10 with a commercial gas canister resting on the extension 206 and the plate 210. The figure further shows the tip of the nozzle of the commercial gas canister passing through the inlet 212 and into an interior 410 of the body 102. FIG. 4A additionally illustrates a partial view of the face of the plate 210, the face of the end cap 204, and the extension 206. The exhaust 104 and the body 102 both are shown to have circular cross-sections; however, this is not a requirement for the apparatus 10 to function as intended.

Additionally illustrated in FIG. 4A is a baffle 402 inside the body 102. This baffle 402 is unique in boom guns because, unlike boom guns in the prior art, it has no hole diameter. This is beneficial because, when the gas-air mixture is ignited, it forces the combustion and sound waves around the outside edge of the baffle 402, increasing the decibel level of the noise and more closely simulating the sound of a shotgun than those boom guns found in the prior art.

The shape of the baffle 402 also keeps the area of ignition between the end cap 204 and the baffle 402 more contained, thereby allowing better control of the gas-air mixture and a more consistent sound than prior art devices. While FIG. 4A shows baffle 402 as generally circular, this is not required for the apparatus 10 to properly function if the body 102 is shaped differently, as long as the baffle fits into the shape of the body 102, similarly to as is shown in this figure.

Figure 4B:
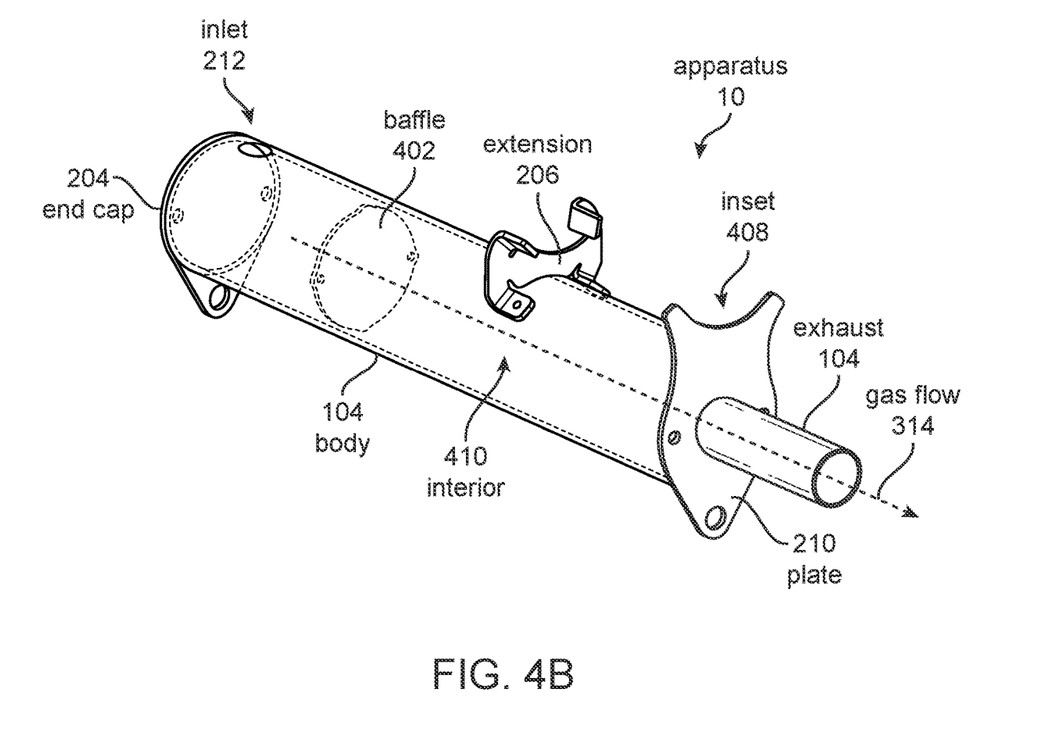
FIG. 4B illustrates an example of a semi-transparent perspective view of a boom gun.

FIG. 4B illustrates a semi-transparent perspective view of the apparatus 10 similar to the view of FIG. 4A. However, FIG. 4B shows the commercial gas canister, nozzle, and actuator mechanism removed to better illustrate the shapes of the extension 206, the plate 210, and the inlet 212. This figure additionally shows the inset 408 defined by the plate, in which the commercial gas canister is able to sit when attached to the boom gun.

Similar to how the extension 206 was described previously, the inset 408 helps to stabilize the commercial gas canister by limiting its side-to-side movement and preventing the previously mentioned ergonomically designed layout of apparatus 10 from being modified to become non-ergonomic. This also helps to maintain the integrity of the commercial gas canister, nozzle, and trigger mechanism by reducing the amount the user 20 may have to replace these pieces. To reiterate the benefits of extension 206 as described in FIG. 2, without the inset 408, the commercial gas canister, nozzle, and/or actuator mechanism may move and be damaged by knocking into other components or objects in the environment.

Additionally shown in FIG. 4B is the body 102 with an interior 410. The interior 410 of the body 102 is where a majority of the combustion of the gas-air mixture and the resulting sound waves are generated. Also shown in the interior 410 is the baffle 402, which is generally placed in an area of the boom gun where it is operational, as well as the gas flow 314. Although the gas comes from a commercial gas canister, FIG. 4B illustrates the arrow showing the gas flow 314 as beginning in the area between the end cap 204 and the baffle 402 for ease of understanding, as the commercial gas canister is not present in this figure. Furthermore, the figure shows the gas flow 314 moving from this space past the baffle 402, through the exhaust 104, and out of the boom gun.

Figure 5:
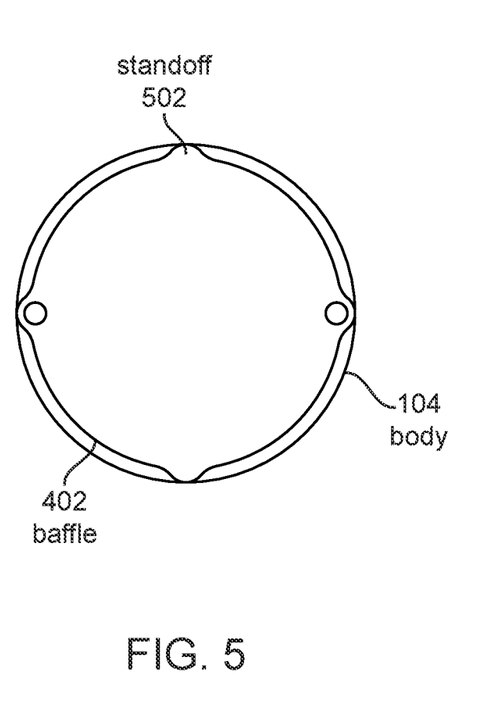
FIG. 5 illustrates a front view of a baffle as it may appear inside a body, according to some examples.

FIG. 5 illustrates a front view of the baffle 402 as it may appear inside the body 102. This figure shows one way in which the baffle 402 fits within the body 102 and highlights the small gap that can exist between the baffle 402 and the body 102. As previously mentioned, this small gap is beneficial because, when the gas-air mixture is ignited, it forces the combustion and sound waves around the outside edge of the baffle 402, increasing the decibel level of the noise and better simulating the sound of a shotgun than prior art devices. The shape of the baffle 402 also keeps the area of ignition between the end cap 204 and the baffle 402 more contained, thereby allowing better control of the gas-air mixture and a more consistent sound than boom guns in the prior art.

Additionally shown in FIG. 5 is a standoff 502 connected to, or, in some cases, part of, the baffle 402. The standoff 502 allows the gaps between the baffle 402 and the body 102 to remain consistent and controlled during manufacturing. This is beneficial because it ensures that the boom gun has a consistent sound and provides the user 20 with an understanding of what to expect in sound quality and decibel level. The standoff 502 also serves as a point for the baffle 402 to be attached to the body 102 of the boom gun, such as by threading it onto rods extending from the body 102 during manufacturing.

Figure 6:
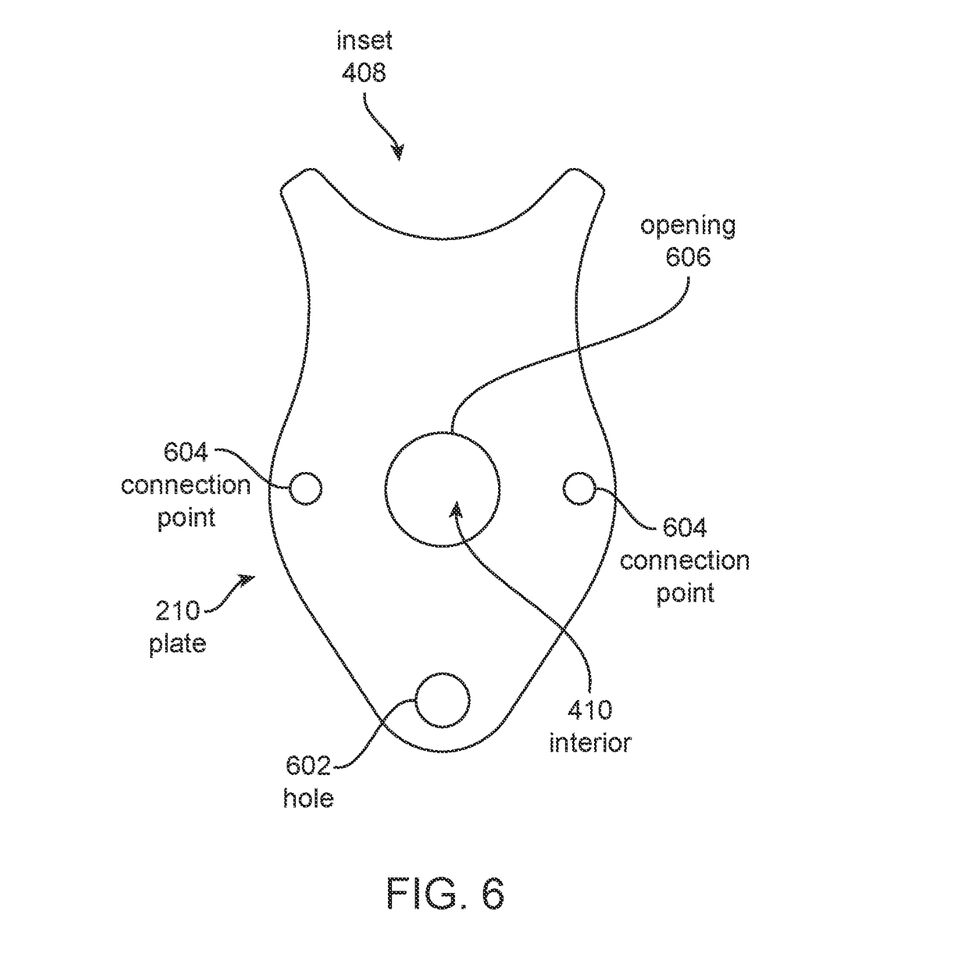
FIG. 6 illustrates a front view of a plate, according to some examples.

FIG. 6 illustrates a front view of the plate 210 with multiple openings and features. At one end of the plate 210, the inset 408 is shown and is being formed by two prongs extending up and out from the rest of the plate 210. As previously mentioned, the commercial gas canister can sit in the inset 408 so that it is limited in its horizontal movement, and thereby the ergonomic design of the boom gun is maintained. Although the inset 408 is illustrated with a circular edge, this is not a requirement for the boom gun to operate as intended. Across the face of the plate 210 from the inset 408, a hole 602 is seen. This hole 602 may be used as a location where the strap 202 can connect to the plate 210. While the hole 602 may receive the strap, it may also be used to attach other items to the plate 210, such as other forms of harnesses used to hold the boom gun.

Additionally, FIG. 6 illustrates an opening 606 where the gas flow 314 moves from the interior 410 into the exhaust 104. The figure also shows two instances of a connection point 604, which are used to attach the plate 210 to the body 102 using a connector such as a bolt, a fastener, etc., giving additional stability to the plate 210.

Figure 7:
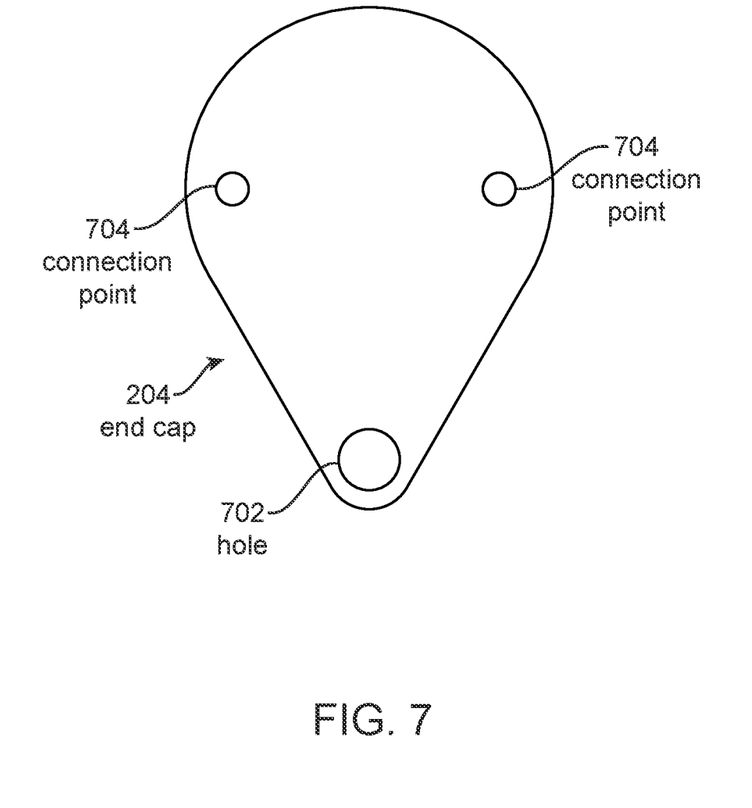
FIG. 7 illustrates a front view of an end cap, according to some examples.

FIG. 7 illustrates a front view of the end cap 204 with multiple features. At one end of the face of the end cap 204, a hole 702 is seen. Similar to the hole 602 in the plate 210, the hole 702 may be used as a location where the strap 202 can connect to the end cap 204. While the hole 702 may receive the strap, it may also be used to attach other items to the end cap 204, such as other forms of harnesses used to hold the boom gun. Additionally, FIG. 7 shows two instances of a connection point 704, which is used to attach the end cap 204 to the body 102 using a connector such as a bolt, a fastener, etc., giving additional stability to the end cap 204.

Figure 8:
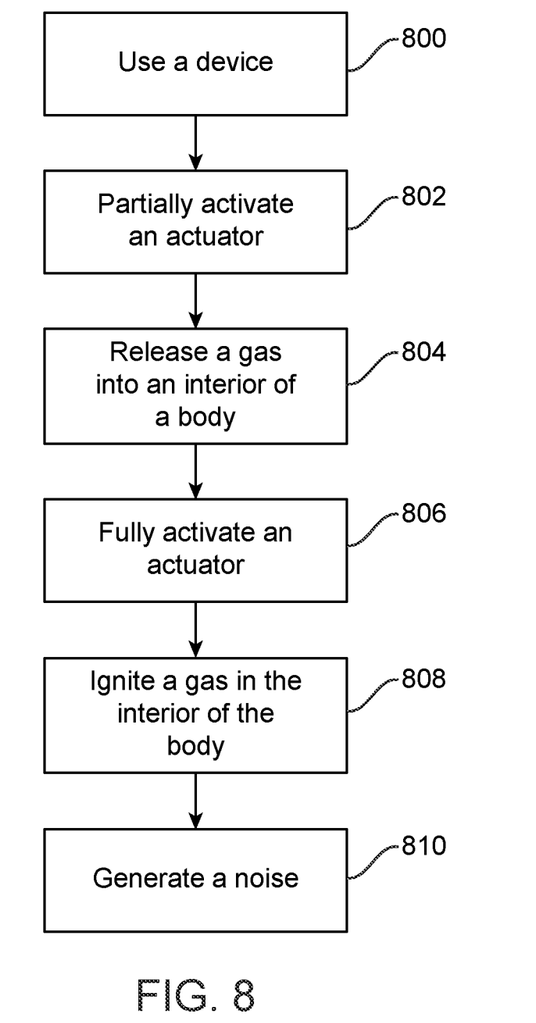
FIG. 8 illustrates a flowchart depicting a method of using a boom gun system, according to some examples.

FIG. 8 illustrates a method of using a device (at step 800). For instance, the device of step 800 may be the apparatus 10 of any of FIGS. 1-7. FIG. 8 further illustrates partially activating an actuator (at step 802). In some cases, the actuator can be a trigger mechanism on a commercial gas canister, but is generally a component that allows the release and/or ignition of a gas-air mixture. Partially may mean depressing the actuator to a distance that is between fully depressed and not depressed at all. Additionally, the figure shows the step of releasing a gas into an interior of a body (at step 804). This is often in response to partially activating the actuator of the device, especially an actuator on a commercial gas canister which begins the release of gas into the device.

FIG. 8 also illustrates fully activating an actuator (at step 806) and igniting a gas in the interior of the body (at step 808). In some cases, fully activating the actuator of a boom gun, including many actuators on commercial gas canisters, will ignite the gas coming from a gas canister. The ignited gas will then often mix with the gas-air mixture in the boom gun, causing a further combustion reaction. FIG. 8 additionally shows the step of generating a noise (at step 810). The generation of a noise in a boom gun is often the direct result of the combustion reaction previously mentioned and air escaping the device.

Figure 9:
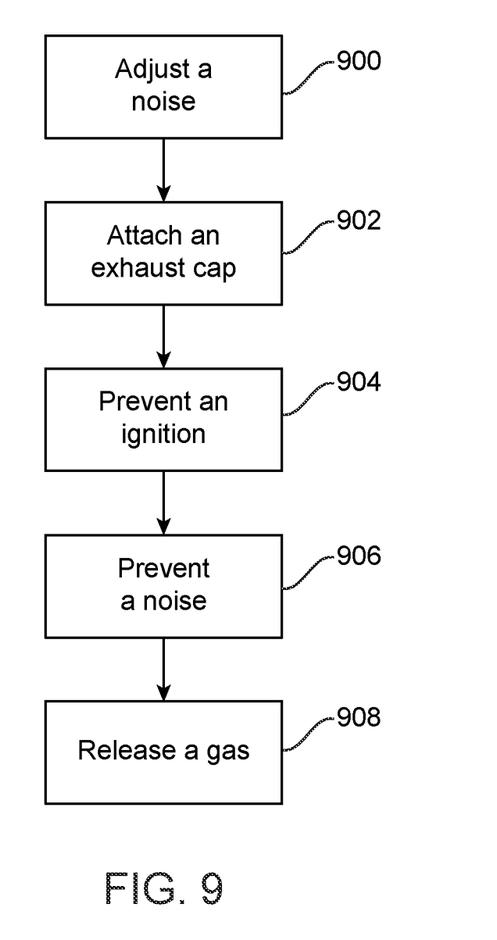
FIG. 9 illustrates a flowchart depicting a method of noise adjustment and suppression of a boom gun system, according to some examples.

FIG. 9 illustrates a method of adjusting a noise (at step 900), especially the noise produced by a device such as the apparatus of FIGS. 1-7. FIG. 9 further illustrates attaching an exhaust cap (at step 902) to the device. The exhaust cap will often create an air-tight seal on the exhaust it is attached to. This may result in the creation of a closed system in the device, where air and/or gas cannot enter or exit.

This figure also illustrates preventing an ignition (at step 904). This step is often completed within the device and may be a direct result of the closed system created by attaching an exhaust cap. If the closed system of the device has no air inside, the ignition would not be possible as the combustion reaction requires both gas and air in the mixture.

FIG. 9 also shows the prevention of a noise (at step 906). The noise prevention often is a direct result of preventing an ignition as the combustion reaction the ignition begins and its forcing of air out of the device is usually what causes a noise to be produced. Without an ignition, there is often no progression of a combustion reaction that would generate the noise.

Additionally, FIG. 9 illustrates releasing a gas (at step 908). The release of a gas could be a result of partially activating an actuator, such as one from step 804 of FIG. 8. When the gas is released, it is allowed into the device and may flow around a baffle through gaps formed by the baffle, the interior of a body of the device, and any standoffs present between the baffle and the interior of the body.

The present disclosure includes an apparatus 10, including a body 102 defining a first perimeter, the body 102 including a first body end 302, a second body end 304 opposite the first body end 302, and a first wall 306 therebetween. In some examples, the first body end 302 is closed and the second body end 304 is open. According to some examples, the first wall 306 at least partially surrounds the first perimeter, thereby forming an interior 410 of the body 102. An inlet 212 may extend through the first wall 306, the inlet 212 configured to receive a nozzle of a commercial gas canister. In some examples, the apparatus 10 includes an exhaust 104 fixedly coupled to the second body end 304 and defining a second perimeter that is smaller than the first perimeter. According to some examples, the exhaust 104 includes a first exhaust end 308, a second exhaust end 310 opposite the first exhaust end 308, and a second wall 312 therebetween, the second wall 312 at least partially surrounding the second perimeter. The first exhaust end 308 and the second exhaust end 310 may be open. In some examples, the first exhaust end 308 is configured to fluidly couple to the second body end 304.

According to some examples, the apparatus 10 further includes a plate 210 coupled to the body 102 at the second body end 304, the plate 210 coupled to the exhaust 104 at the first exhaust end 308. The plate 210 may be configured to permit passage of a gas from the body 102 to the exhaust 104. In some examples, the plate 210 is configured to prevent passage of a gas from the body 102 outside of the second perimeter. According to some examples, the apparatus 10 further includes a strap 202 configured to be secured to the plate 210.

The plate 210 may include an inset 408 configured to receive a commercial gas canister. In some examples, the plate 210 defines a hole 602 opposite the inset 408. According to some examples, the apparatus 10 further includes a strap 202 configured to be secured to the hole 602. The exhaust 104 may be detachably coupled to the plate 210.

In some examples, the first body end 302 includes an end cap 204 detachably coupled to the body 102. According to some examples, the apparatus 10 further includes a strap 202 configured to be secured to the end cap 204. The body 102 may include an extension 206 configured to receive a commercial gas canister.

In some examples, the apparatus 10 further includes a baffle 402 within the body 102. According to some examples, the apparatus 10 further includes a standoff 502 coupled to the interior 410 of the body 102, the standoff 502 coupled to the baffle 402. The standoff 502 may be configured to create a baffle 402 perimeter about the baffle 402, the baffle 402 configured to permit gas to pass from the first body end 302, around the baffle 402 perimeter, to the second body end 304.

In some examples, the baffle 402 defines a solid structure. According to some examples, the baffle 402 is configured to permit gas to pass from the first body end 302 to the second body end 304. The baffle 402 may include a baffle 402 perimeter, the baffle 402 configured to permit gas to pass around the baffle 402 perimeter.

In some examples, the apparatus 10 further includes an exhaust cap 208 detachably coupled to the second exhaust end 310. According to some examples, the exhaust cap 208 is configured to create an air-tight seal with the second exhaust end 310, thereby creating a closed system within the body 102 while the nozzle of the commercial gas canister is coupled to the inlet 212. The apparatus 10 may be configured to be operated such that the commercial gas canister lies below the apparatus 10. In some examples, the apparatus 10 is configured to be operated such that an actuator of the commercial gas canister is located on the commercial gas canister opposite the body 102.

Also included in this disclosure is a method including using a device. In some examples, the device includes a body 102 defining an interior 410. According to some examples, the body 102 includes a first body end 302 and a second body end 304 opposite the first body end 302. The first body end 302 may be closed. According to some examples, the second body end 304 is open. In some examples, the device includes an inlet 212 extending into the interior 410 of the body 102. According to some examples, the inlet 212 is configured to receive a commercial gas canister nozzle. The method may include partially activating an actuator on the commercial gas canister. In some examples, the method includes releasing, in response to partially activating the actuator, a gas (e.g., gas flow 314) into the interior 410 of the body 102. According to some examples, the method includes fully activating the actuator on the commercial gas canister. The method may include igniting, in response to fully activating the actuator, the gas within the interior 410 of the body 102. In some examples, the method includes generating a noise in response to igniting the gas.

According to some examples, the method includes the device having an exhaust 104. In some examples, the exhaust 104 is fluidly coupled to the second body end 304. According to some examples, the method includes adjusting the noise generated in response to igniting the gas. The device may include an exhaust cap 208. In some examples, the method includes attaching the exhaust cap 208 to the end of the exhaust 104. According to some examples, the method includes preventing, via the exhaust cap 208, the ignition of the gas. The method may include preventing, via the exhaust cap 208, the noise. In some examples, the device includes a baffle 402. According to some examples, the baffle 402 is rotatably coupled to the interior 410 of the body 102. The method may include releasing the gas around the baffle 402.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 And embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

I claim:

1. An apparatus, comprising:
   a body defining a first perimeter, the body including a first body end, a second body end opposite the first body end, and a first wall therebetween,
   wherein the first body end is closed and the second body end is open, and
   wherein the first wall at least partially surrounds the first perimeter thereby forming an interior of the body;
   an inlet extending through the first wall, the inlet configured to receive a nozzle of a commercial gas canister;
   an exhaust fixedly coupled to the second body end and defining a second perimeter that is smaller than the first perimeter, the exhaust including a first exhaust end, a second exhaust end opposite the first exhaust end, and a second wall therebetween, the second wall at least partially surrounding the second perimeter,
   wherein the first exhaust end and the second exhaust end are open, and
   wherein the first exhaust end is configured to fluidly couple to the second body end; and
   a plate coupled to the body at the second body end and coupled to the exhaust at the first exhaust end, the plate configured to permit passage of a gas from the body to the exhaust, and the plate including an inset configured to receive a commercial gas canister.

2. The apparatus of claim 1, wherein the plate is configured to prevent passage of a gas from the body outside of the second perimeter.

3. The apparatus of claim 1, further comprising a strap configured to be secured to the plate.

4. The apparatus of claim 1, wherein the plate defines a hole opposite the inset.

5. The apparatus of claim 4, further comprising a strap configured to be secured to the hole.

6. The apparatus of claim 1, wherein the exhaust is detachably coupled to the plate.

7. The apparatus of claim 1, wherein the first body end includes an end cap detachably coupled to the body.

8. The apparatus of claim 7, further comprising a strap configured to be secured to the end cap.

9. The apparatus of claim 1, wherein the body includes an extension configured to receive a commercial gas canister.

10. The apparatus of claim 1, further comprising an exhaust cap detachably coupled to the second exhaust end.

11. The apparatus of claim 10, wherein the exhaust cap is configured to create an air-tight seal with the second exhaust end, thereby creating a closed system within the body while the nozzle of the commercial gas canister is coupled to the inlet.

12. The apparatus of claim 1, wherein the apparatus is configured to be operated such that an actuator of the commercial gas canister is located on the commercial gas canister opposite the body.

13. An apparatus, comprising:
   a body defining a first perimeter, the body including a first body end, a second body end opposite the first body end, a first wall therebetween, a baffle within the body, and a standoff coupled to an interior of the body and coupled to the baffle,
   wherein the first body end is closed and the second body end is open, and
   wherein the first wall at least partially surrounds the first perimeter thereby forming the interior of the body;
   an inlet extending through the first wall, the inlet configured to receive a nozzle of a commercial gas canister; and
   an exhaust fixedly coupled to the second body end and defining a second perimeter that is smaller than the first perimeter, the exhaust including a first exhaust end, a second exhaust end opposite the first exhaust end, and a second wall therebetween, the second wall at least partially surrounding the second perimeter, wherein the first exhaust end and the second exhaust end are open, and wherein the first exhaust end is configured to fluidly couple to the second body end.

14. The apparatus of claim 13, wherein the standoff is configured to create a baffle perimeter about the baffle, the baffle configured to permit gas to pass from the first body end, around the baffle perimeter, to the second body end.

15. The apparatus of claim 14, wherein the baffle is configured to permit gas to pass from the first body end to the second body end.

16. The apparatus of claim 15, wherein the baffle includes a baffle perimeter, the baffle configured to permit gas to pass around the baffle perimeter.

17. An apparatus, comprising:

a body defining a first perimeter, the body including a first body end, a second body end opposite the first body end, a first wall therebetween, and a baffle within the body, the baffle defining a solid structure, wherein the first body end is closed and the second body end is open, and wherein the first wall at least partially surrounds the first perimeter thereby forming an interior of the body, an inlet extending through the first wall, the inlet configured to receive a nozzle of a commercial gas canister; and an exhaust fixedly coupled to the second body end and defining a second perimeter that is smaller than the first perimeter, the exhaust including a first exhaust end, a second exhaust end opposite the first exhaust end, and a second wall therebetween, the second wall at least partially surrounding the second perimeter, wherein the first exhaust end and the second exhaust end are open, and wherein the first exhaust end is configured to fluidly couple to the second body end.

18. The apparatus of claim 17, further comprising a plate coupled to the body at the second body end, the plate coupled to the exhaust at the first exhaust end, wherein the plate is configured to permit passage of a gas from the body to the exhaust.

19. The apparatus of claim 17, wherein the first body end includes an end cap detachably coupled to the body.

20. The apparatus of claim 17, wherein the body includes an extension configured to receive a commercial gas canister.

* * * * *